INVENTOR
HUBERTUS REIMANN
SIEGFRIED SCHUTZE

BY Young & Thompson
ATTYS.

United States Patent Office 3,615,141
Patented Oct. 26, 1971

3,615,141
PHOTOGRAPHIC EXPOSURE METER ARRANGEMENT WITH PHOTOCONDUCTIVE CELL
Hubertus Reimann and Siegfried Schutze, Dresden, Germany, assignors to VEB Pentacon Dresden Kameraund Kinowerke, Dresden, Germany
Filed Sept. 30, 1968, Ser. No. 763,624
Int. Cl. G01j 1/44
U.S. Cl. 356—226
4 Claims

ABSTRACT OF THE DISCLOSURE

Exposure meter arrangement with photo-conductive cell and a battery feeding the latter, also a galvanometer the pointer zero position of which indicates the balancing of the measuring apparatus brought about by resistance attenuation elements, and thus the correct combination of the exposure factors according to brightness, wherein on the one hand the entire measuring apparatus including galvanometer is connectible through a switch to the battery and in that on the other hand when the battery is disconnected from the entire measuring apparatus a permanent current at the level of the self-discharge current of the battery is fed to the galvanometer through an auxiliary current path which is of high ohmic value in comparison with every resistance value of the measuring apparatus.

BACKGROUND TO THE INVENTION

The invention relates to an exposure arrangement with photo-conductive cell and a voltage source feeding the latter, also an electric indicator which indicates the correct combination according to brightness of the exposure factors settable on a hand exposure meter or a photographic camera.

Known apparatuses of this kind are formed as bridge or compensation circuits in which for example a galvanometer is used for the indication of the balancing operation. The balance and thus the correct setting of the exposure factors according to brightness are achieved when the meter pointer stands on the zero mark of the setting scale.

However, the information of this pointer position is not unequivocal, since even when the feed voltage is switched off the meter pointer assumes the same position, that is the zero position. Thus the zero position of the meter pointer when the measuring apparatus is switched off can simulate a balance thereof and thus the correct setting of the camera according to brightness, so that incorrect exposures can take place.

To avoid this condition it has been proposed to conduct the meter pointer mechanically into the zero position by a return spring. With the purpose of bringing about the correct setting according to brightness, after the feed voltage has been switched on a balancing resistance is varied until the meter pointer stands opposite to a setting mark which is situated at a certain distance from the zero mark. Accordingly the balancing no longer takes place to zero but to a specific current value, so that the advantage of the independence of feed voltage of a bridge in the balanced condition, given per se, is lost.

It is the purpose of the invention to facilitate the bringing about of the correct setting of a photo-electric exposure-measuring apparatus according to brightness for the operator.

The problem of the invention consists in providing a photo-electric exposure-measuring apparatus which with high balancing accuracy and voltage independence in the case of balancing ensures an unequivocal distinction between balance and voltage-less condition, without the use, apart from the working voltage switch, of further switches or mechanical return or covering members which influence the indicator of the measuring apparatus.

SUMMARY OF THE INVENTION

According to the invention this problem is solved due to the fact that on the one hand the entire measuring apparatus including the galvanometer is connectable through a switch to the battery and that on the other hand when he battery is disconnected from the entire measuring apparatus a permanent current at the level of the self-discharge current of the battery is fed to the galvanometer through an auxiliary current path of high ohmic value in comparison with each resistance value of the measurement apparatus. Due to the arrangement of the galvanometer according to the invention in a measuring circuit and a monitor circuit, now the zero position of the galvanometer unequivocally indicates the correct exposure factor combination according to brightness. Simulation of this setting is no longer possible. A reduction of life of the battery does not occur. For the connection of the galvanometer into both circuits there serves a switch formed as on-off switch, the series-connection of which with a resistance branch is connected in parallel with the measuring apparatus of the auxiliary current path, which is at least ten times of higher ohmic value than the said resistance branch. Thus for the obtaining of both galvanometer functions only one switch is needed, which was necessary hitherto in any case in every battery-fed exposure-measuring apparatus. The switch can however also be formed as mechanical on-off or change-over switch so that in the measuring position the auxiliary current path is completely cut off. If one and the same battery is used for the feeding of the exposure apparatus and for the feeding of the permanent current, then when the battery is cut off from the exposure-measuring apparatus a battery feed inspection can be carried out at the same time.

The invention will be explained hereinafter by reference to the illustrated examples of embodiment.

DESCRIPTION OF THE PREFERRED EMBODIMENT

Figure 1:
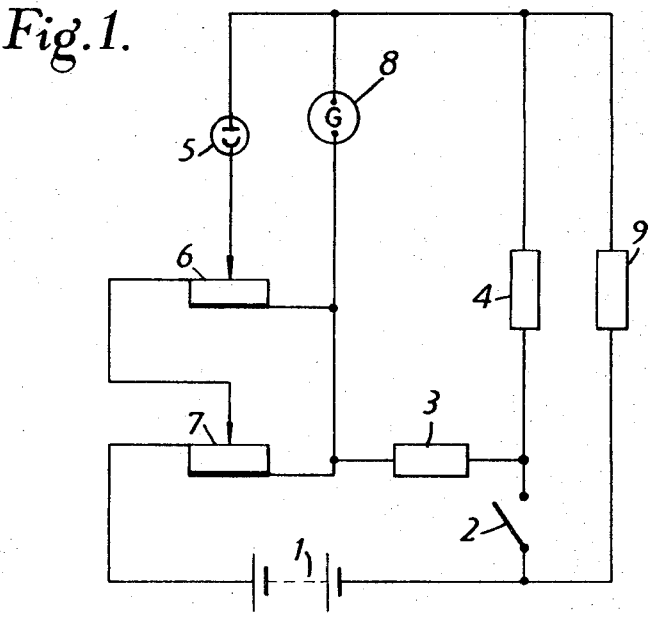
FIG. 1 shows voltage-controlled bridge circuit with auxiliary current path.

According to FIG. 1 a battery 1 is connectable in known manner through an on off switch 2 to an exposure-measuring apparatus which is formed by a voltage-controlled bridge circuit constituting a compensation circuit. The latter consists of fixed resistors 3, 4 and a photo-conductive cell 5, also of resistance attenuation elements 6 and 7 known as high frequency voltage dividers. Where the measuring apparatus is used in a photographic camera, the slider of the resistance-attenuation element 6 is coupled for example with the setting members for diaphragm aperture and film sensitivity and the resistance-attenuation element 7 is coupled with the time-setting member of the camera. A galvanometer 8 is used as balance indicator. In parallel with the series-connection of the switch 2 with the fixed resistor 4 an auxiliary current path is connected which is formed by a resistor 9 of at least ten times higher ohmic value than the resistor 4.

The manner of operation is as follows:
For the purpose of correct exposure setting of the camera according to brightness, with the switch 2 closed the tappings of the resistance-attenuation elements 6 and 7 are shifted until the current flowing through the photo-conductive cell 5 and the galvanometer 8 on the one hand is equal in level to the current which flows in the opposite direction on the other hand through the circuit formed by the resistors 3 and 4 and the galvanometer 8. In this case the pointer of the galvanometer points to the zero mark of the instrument scale and an exact exposure can be carried out. On account of the high ohmic value of the resistor 9, the latter has no influence upon the said exposure setting.

If no further picture is to be taken, the switch 2 is brought into the position as illustrated and thus the exposure-measuring apparatus is cut off from the battery 1. Now a current of the magnitude of the self-discharge current of the battery flows through the high-ohmic resistor 9. Since the photo-conductive cell 5 and the fixed resistor 4 are large in comparison with the internal resistance of the galvanometer 8, practically a permanent current flows over the resistor 9, the galvanometer 8, the attenuation element 7 back to the battery 1, which current path forms an auxiliary circuit.

This permanent current permits the galvanometer pointer to assume a position differing from the zero mark. Since this permanent current is not influenceable by the attenuation elements, it is indicated unequivocally to the photographer that the battery is cut off from the exposure-measuring apparatus. By reference to the magnitude of the pointer deflection assumed at this switch position, the voltage condition of the battery can be inspected at the same time. A shortening of the life of the battery 1 does not occur due to the permanent current of the magnitude of the self-discharge current of the battery, nor does any influence of the correct exposure setting according to brightness take place.

Figure 2:
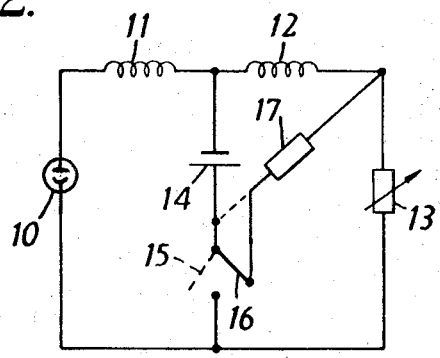
FIG. 2 shows compensation circuit with centre tapping of the galvanometer coil and auxiliary current path.

According to FIG. 2 a compensation circuit is illustrated the light-measuring circuit of which is formed by a photo-conductive cell 10 and one winding half 11 of a galvanometer and its balancing circuit is formed by the other winding half 12 and a comparison resistor 13. A battery 14 serves as voltage source, which is connectable to the said circuits either through an on-off switch 15 represented in chain lines or through a change-over switch 16. A high-ohmic resistor 17 forms an auxiliary current path which is connectable to the battery either directly when an on-off switch 15 is used in the form represented in chain lines or through the change-over switch 16 if this is used. In both cases a permanent current of the indicated intensity flows in the circuit formed by the battery 14, the winding half 12 and the resistor 17, which current does not permit the galvanometer pointer to set itself to the zero mark and thus indicates the voltage-less condition of the exposure-measuring apparatus. Again the voltage condition of the battery 14 can be inspected by reference to the magnitude of deflection. The galvanometer pointer points to the zero mark when with the switch 15 closed or the change-over switch 16 moved over the battery 14 is connected to the exposure-measuring apparatus and torques of equal magnitude but opposite direction are generated through the two windings 11, 12. This is the case only on exposure setting which is correct according to brightness.

We claim:
1. An exposure meter arrangement including a galvanometer, a scale mounted for association with an indicator needle of the galvanometer, said scale having its zero mark situated centrally thereof, a measuring compensation circuit including a photoelectric cell connected in series with at least one resistance attenuation element, a battery having one side thereof connected to said element, an on-off switch connected to the other side of said battery for connecting the battery in said measuring circuit and an auxiliary circuit permanently connected with the other side of said battery and to one side of the galvanometer, said auxiliary circuit including a resistance at least ten times greater than any resistance in any current path through said measuring circuit, being sufficiently high to limit the current in said auxiliary circuit substantially to the self discharge current of said battery, whereby upon switching said battery into said measuring circuit and adjusting said resistance attenuation element the needle of said galvanometer is made to correspond with the zero mark of said scale thereby to indicate a correct exposure reading and whereby when said battery is disconnected from said measuring circuit the galvanometer needle deviates from the zero mark.

2. An apparatus as claimed in claim 1, wherein the switch for connecting and disconnecting the measuring circuit is a mechanical switch connected between the measuring circuit and the auxiliary circuit.

3. An apparatus as claimed in claim 1, including a voltage source connected in parallel with the galvanometer through a resistor, the source being independent of the battery of the measuring apparatus for providing a permanent source of current through the galvanometer, the resistor being of high ohmic value relative to that of the moving coil winding of the galvanometer.

4. An apparatus as claimed in claim 1, wherein the measuring circuit is a voltage controlled bridge circuit and wherein two arms of the bridge are each formed by a fixed resistor and the other two arms being formed by a combination of the photoelectric cell and the resistance attenuator element.

References Cited

UNITED STATES PATENTS

| | | | |
|---|---|---|---|
| 2,354,544 | 7/1944 | Rath | 356—226 X |
| 2,379,102 | 6/1945 | Rath | 356—226 X |
| 2,699,086 | 1/1955 | Finch | 356—225 |
| 3,147,680 | 9/1964 | Stimson | 356—226 X |
| 3,445,170 | 5/1969 | Dietrich et al. | 356—226 |

FOREIGN PATENTS

| | | | |
|---|---|---|---|
| 1,153,547 | 8/1963 | Germany | 356—226 |

RONALD L. WIBERT, Primary Examiner

W. A. SKLAR, Assistant Examiner

U.S. Cl. X.R.

250—210